United States Patent [19]

Christiansen et al.

[11] Patent Number: 5,533,078
[45] Date of Patent: Jul. 2, 1996

[54] NUCLEAR FUEL ASSEMBLY FOR A PRESSURIZED WATER REACTOR

[75] Inventors: David W. Christiansen, Kennewick; John W. Long, Richland, both of Wash.

[73] Assignee: Siemens Power Corporation, Richland, Wash.

[21] Appl. No.: 314,758

[22] Filed: Sep. 29, 1994

[51] Int. Cl.[6] .................................................... G21C 3/34
[52] U.S. Cl. ........................ 376/438; 376/440; 376/437; 376/449; 376/442
[58] Field of Search ..................... 376/438, 446, 376/440, 437, 449, 442; 976/DIG. 73

[56] References Cited

U.S. PATENT DOCUMENTS

| | | | |
|---|---|---|---|
| 3,015,616 | 2/1962 | Strutz et al. | 204/193.2 |
| 3,137,638 | 6/1964 | Kumpf et al. | 176/78 |
| 3,619,367 | 11/1971 | Gumuchian | 376/439 |
| 3,801,453 | 4/1974 | Jones | 376/440 |
| 3,802,995 | 4/1974 | Fritz et al. | 376/435 |
| 3,828,868 | 8/1974 | Jabsen | 376/440 |
| 3,862,884 | 1/1975 | Jabsen | 376/440 |
| 4,152,206 | 5/1979 | Jabsen | 376/462 |
| 4,297,171 | 10/1981 | Olsson | 376/440 |
| 4,452,755 | 6/1984 | Hylton | 376/364 |
| 4,560,532 | 12/1985 | Barry et al. | 376/434 |
| 4,587,092 | 5/1986 | Feutrel | 376/438 |
| 4,645,643 | 2/1987 | Leclercq | 376/447 |
| 4,655,995 | 4/1987 | Freeman et al. | 376/267 |
| 4,684,501 | 8/1987 | Lui | 376/446 |
| 4,777,016 | 10/1988 | Yoshioka et al. | 376/444 |
| 5,009,839 | 4/1991 | King | 376/352 |
| 5,069,865 | 12/1991 | Yeo et al. | 376/451 |
| 5,267,286 | 11/1993 | Hirukawa | 376/353 |

*Primary Examiner*—Donald P. Walsh
*Assistant Examiner*—Meena Chelliah
*Attorney, Agent, or Firm*—Ira Lee Zebrak

[57] ABSTRACT

A nuclear fuel assembly for a pressurized water reactor having lower and upper tie plates, guide tubes, spacer grids, an instrumentation tube, and extended fuel rods which extend to the lower tie plate and which are spaced radially and supported along the guide tubes by the spacer grids, at least one of the extended fuel rods having at a lower end a fuel rod lower end cap secured by a first spring within an aperture in the lower tie plate and which exerts a lateral force against the lower end cap. The upper tie plate further includes a fuel rod support housing which extends down over the upper end of the at least one of the extended fuel rods and has a second spring positioned in a bore in the fuel rod support housing which exerts a lateral force on the upper end of the extended fuel rod positioned within the bore in the fuel rod support housing.

3 Claims, 5 Drawing Sheets

FIG. 1 (PRIOR ART)
FIG. 2
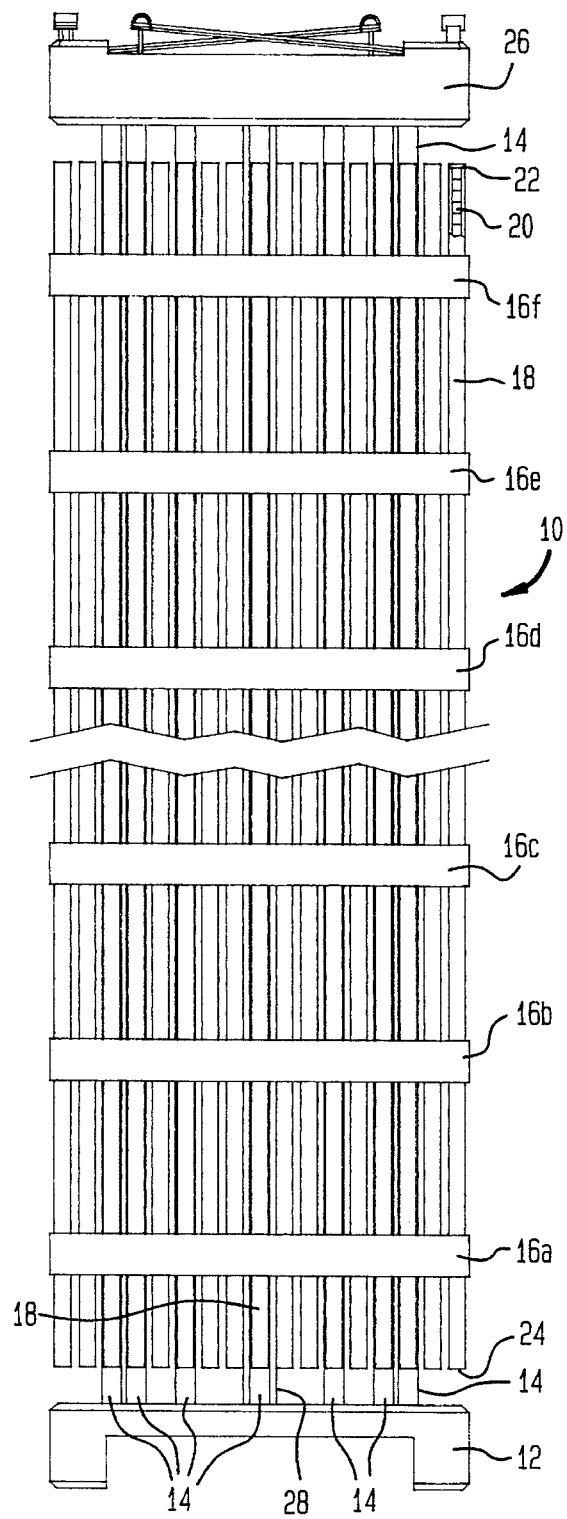
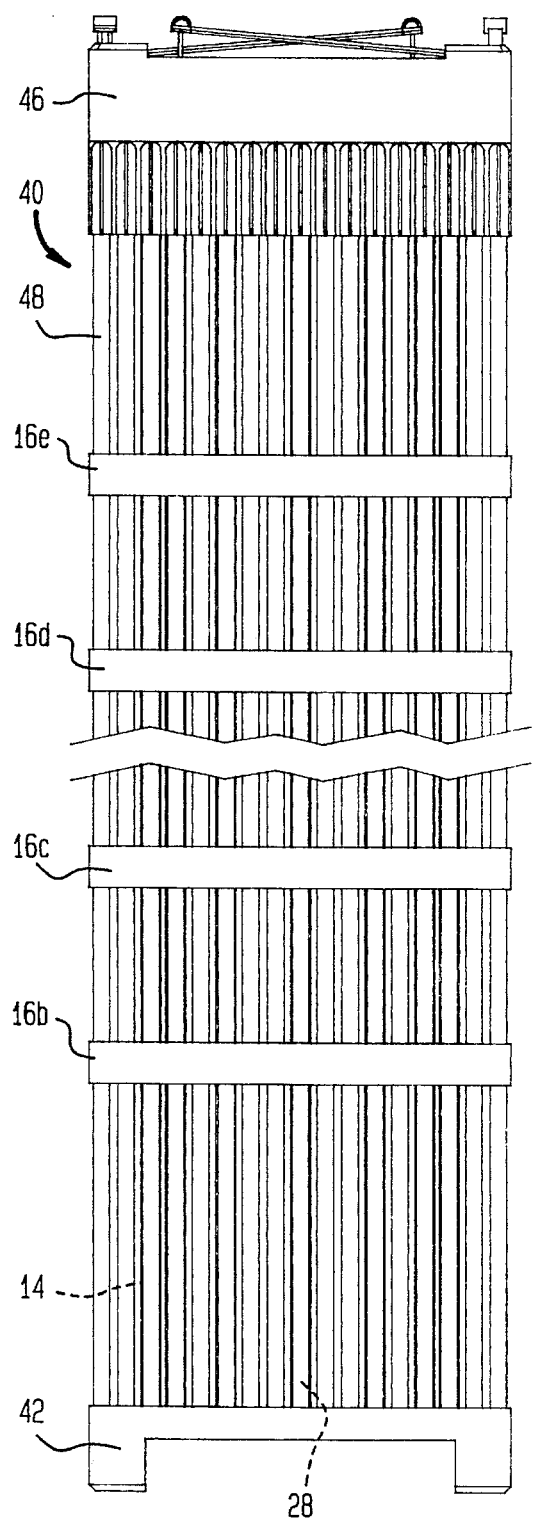

NUCLEAR FUEL ASSEMBLY FOR A PRESSURIZED WATER REACTOR

FIELD OF THE INVENTION

The present invention relates generally to nuclear fuel assemblies for pressurized water nuclear rectors, and more particularly to decreasing the pressure drop across the fuel assembly and increasing the amount of power generated by the fuel assembly.

Background of the Invention

As is well known, improvements in fuel cycle costs of nuclear power plants may be achieved by increasing the net amount of fuel in the fuel assemblies in the reactor core. Although increasing the diameter of the fuel rods would produce such an increase, it would also result in the concomitant increase in the resistance to coolant flow within the assembly and an increase in pressure drop. Spacer grids which assist in maintaining the fuel rods in fixed positions in the fuel assembly also contribute significantly to the resistance to coolant flow and increase in pressure drop across the fuel assembly. Since reactor power levels are limited by the amount of coolant flowing through the assembly as well as by local heat transfer conditions present at the surface of the fuel rods, it is highly desirable that spacer grids offer as little resistance to coolant flow as is possible. Furthermore, since there are several spacer grids which are located at selected intervals along the length of the fuel assembly, their total contribution to resistance to coolant flow and pressure drop affects the maximum quantity of nuclear fuel that may be utilized in a particular fuel assembly design. It would thus be an advantage over prior art designs if a spacer grid offered lower resistance to coolant flow, or one or more of the spacer grids could be eliminated from the assembly resulting in a decrease in the pressure drop and thereby permitting an increase in the total amount of power generated by the nuclear fuel assembly.

Further improvements in nuclear reactor operations could be achieved if the amount of power that could be safely produced within the fuel assembly was increased.

Spacer grids which provide lateral bracing and rod-to-rod spacing are typically designed to allow differential axial expansion of the fuel rods. Springs incorporated in the spacer grids are most frequently used to permit some sliding of the fuel rods with respect to the spacer grids. In some of the designs, the spacer grid is free to move axially a small amount to accommodate minor changes in the axial length of the fuel rods during irradiation. If spacer grids were to be rigidly connected to the fuel rods as well as to structural members of the fuel assembly, then relative axial movement due to rod growth and thermal expansion of adjacent rods can cause local fuel rod skewing and bowing.

As is well known, spacer grids are generally built up from a relatively large number of different intricately shaped strips that are fitted together to form spacer cells and subsequently welded. Each spacer cell includes dimples and/or springs to maintain the desired rod-to-rod spacing. Thus, the springs and dimples keep the fuel rods in their proper lateral positions. But, under the influence of radiation, the springs are prone to relax and this can lead to undesirable changes in fuel rod pitch (i.e. rod-to-rod spacing) or it may cause gaps or spaces to develop between fuel rods and the springs and dimples, and increases the likelihood that the rods and/or spacer grids will vibrate. Such gaps, changes in fuel rod pitch, and vibration may lead to fuel rod fretting and failure. Furthermore, as the fuel is irradiated, the fuel rods undergo a shrinkage or diameter reduction known as "creepdown" which can result in gaps between the fuel rod cladding and the springs or dimples which in turn can cause or contribute to fuel rod fretting.

Thus, it would be an advantage over prior art nuclear fuel assemblies to: (a) eliminate at least one spacer from the assembly and thereby decrease the pressure drop across the assembly and increase the power generated by the assembly; and (b) further increase the power generated by the assembly by replacing the eliminated spacer(s) with a securing means which permits additional fuel to be placed within the fuel rods but without extending the overall length of the fuel assembly and without increasing the pressure drop across the fuel assembly.

SUMMARY OF THE INVENTION

A nuclear fuel assembly having a predetermined overall length for a pressurized water reactor, comprising a lower tie plate having at least one aperture, a guide tube having an upper end and a lower end connected to the lower tie plate, spacer grids spaced along the guide tube, an upper tie plate which is attached to the upper end of the guide tube, an instrumentation tube attached at one end to the lower tie plate and attached at an opposite end to the upper tie plate, extended fuel rods which extend to the lower tie plate and which are spaced radially and supported along the guide tube by the spacer grids, and at least one of the extended fuel rods has at a lower end a fuel rod lower end cap which is secured within the aperture in the lower tie plate.

BRIEF DESCRIPTION OF THE DRAWINGS

FIG. 1 is a side elevational view of a prior art nuclear fuel assembly for a pressurized water reactor;

FIG. 2 is a side elevational view of a nuclear fuel assembly for a pressurized water reactor in accordance with the present invention;

DETAILED DESCRIPTION OF THE INVENTION

Figure 3:
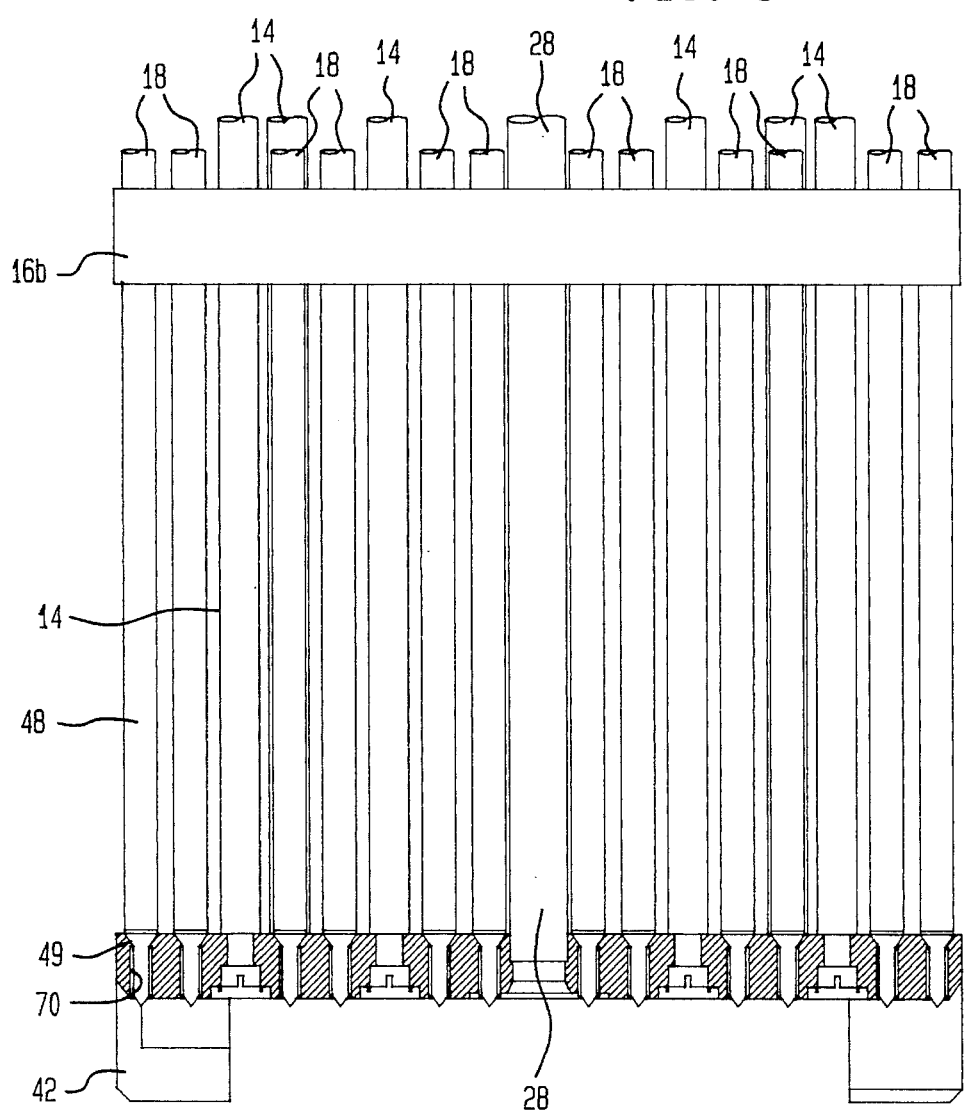
FIG. 3 is an enlarged detail partial sectional view of the lower portion of the fuel assembly in FIG. 2 showing the fuel rods within the lower tie plate.

FIG. 1 represents a pressurized water reactor (PWR) nuclear fuel assembly 10 comprising a lower tie plate 12, guide tubes 14, fuel rods 18 which are spaced radially and supported by spacer grids 16a, 16b, 16c, 16d, 16e, and 16f which are spaced along the guide tubes, instrumentation tube 28, and upper tie plate 37 attached to the upper ends of the guide tubes. Although six spacers are shown for purposes of illustration, other fuel assembly designs can utilize more or less than that shown. Each fuel rod 18 generally includes nuclear fuel pellets 20 composed of fissionable material and an upper end plug 22 and lower end plug 24 which seal the fuel rod. Water as the coolant/moderator is pumped upwardly through the fuel assemblies thereby removing the heat generated by the fuel rods. Control rods which are used to assist in the controlling the fission reaction are disposed in the guide tubes, but are not shown in this view. Several control rods are grouped together and each control rod has a radial arm which interconnect with one another at a central cylindrical member to form a control rod cluster control mechanism for vertically lowering and raising the control rods in the cluster into and out of the guide tubes, and hence into and out of the fuel assembly.

Referring to FIG. 2, a pressurized water reactor (PWR) nuclear fuel assembly 40 according to the invention is shown comprising a lower tie plate 42, guide tubes 14 the lower ends of which are connected to the lower tie plate (not shown in this view), extended fuel rods 48 which are spaced radially and supported along the guide tubes by spacer grids 16b, 16c, 16d and 16e, an instrumentation tube 28 (not shown in this view), and upper tie plate 46 which is attached to the upper ends of the guide tubes. Each extended fuel rod 48 includes nuclear fuel pellets 20 composed of fissionable material. Upper end plug 22 (not shown in FIG. 2) seals the upper end of the extended fuel rod.

In order to decrease the pressure drop across the length of the fuel assembly and to thereby increase the amount of power which can be generated by the fuel assembly, the lowermost spacer (i.e. 16a of the prior art fuel assembly) is eliminated in the assembly 40 as shown in FIG. 2. However, the lowermost spacer of the prior art fuel assemblies functions not only to maintain rod-to-rod spacing between the fuel rods, but also to resists vibration induced fatigue of the lower end of the fuel rod which would occur if the lower ends of the fuel rods were not restrained against movement caused by coolant moderator which flows up through the fuel assembly.

In accordance with the present invention, rather than secure the lower end of the fuel rods to the guide tube by either a spacer, as in the prior art, or any other means which attaches to the guide tube, extended fuel rods 48 extend down to the lower tie plate 42 where they are secured. Although the possibility of vibration induced fatigue of the lower ends of the fuel rods is reduced by extending the fuel rods down into and securing them within the lower tie plate, the possibility of flow induced vibration leading to fretting wear of the lower portion of the fuel rod positioned with the lower tie plate is increased. In accordance with the present invention, the extended fuel rods are secured within apertures in the lower tie plate by the use of a spring which exerts a lateral force on the fuel rod end plug to overcome the vibratory forces induced by the coolant flow thereby preventing lateral motion and possible fuel rod fretting, as well as vibration induced fatigue.

Figure 4:
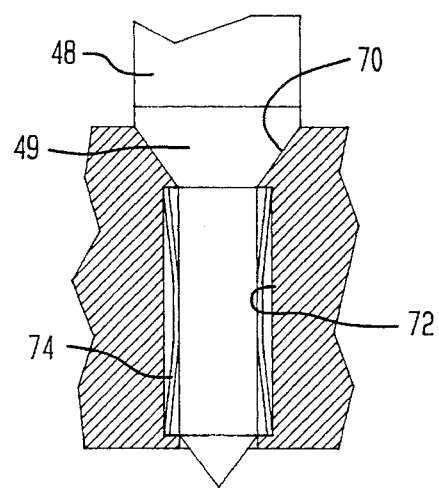
FIG. 4 is an enlarged detail view of FIG. 3 showing one of the fuel rods positioned within the lower tie plate.

Referring to FIG. 3 which is an enlarged partial sectional view of the lower portion of the fuel assembly 40 shown in FIG. 2 showing lower tie plate 42. Each extended fuel rod 48 has at its lower end a fuel rod lower end cap 49 which is positioned in a corresponding aperture 70 in lower tie plate 42. As shown in FIG. 4, which is an enlarged view of one fuel rod positioned within lower tie plate 42, within each aperture 70 is a bore 72 which accommodates spring 74 which exerts lateral forces against the fuel rod end cap 49 to restrain the fuel rod and overcome the vibratory forces induced by the coolant moderator flow thereby preventing lateral motion and possible fuel rod fretting as well as vibration induced fatigue.

In order to further reduce the pressure drop across the fuel assembly and thereby obtain further increased power from the fuel assembly, the uppermost spacer (i.e. spacer 16f of the prior art fuel assemblies) is eliminated. However, as in the situation where the lowermost spacer of the prior art fuel assemblies was removed, vibration induced fatigue of the upper portion of the fuel rod can occur if the fuel rods are unrestrained. In accordance with a further aspect of the present invention, and as shown in FIG. 2, upper tie plate 46 extends down over the top of each fuel rod 48. The top of each fuel rod is secured within a fuel rod support housing which has a plurality of springs each of which exerts a lateral force on the top of the fuel rod to overcome the vibratory forces induced by the coolant flow thereby preventing lateral motion and possible fuel rod fretting.

Figure 5:
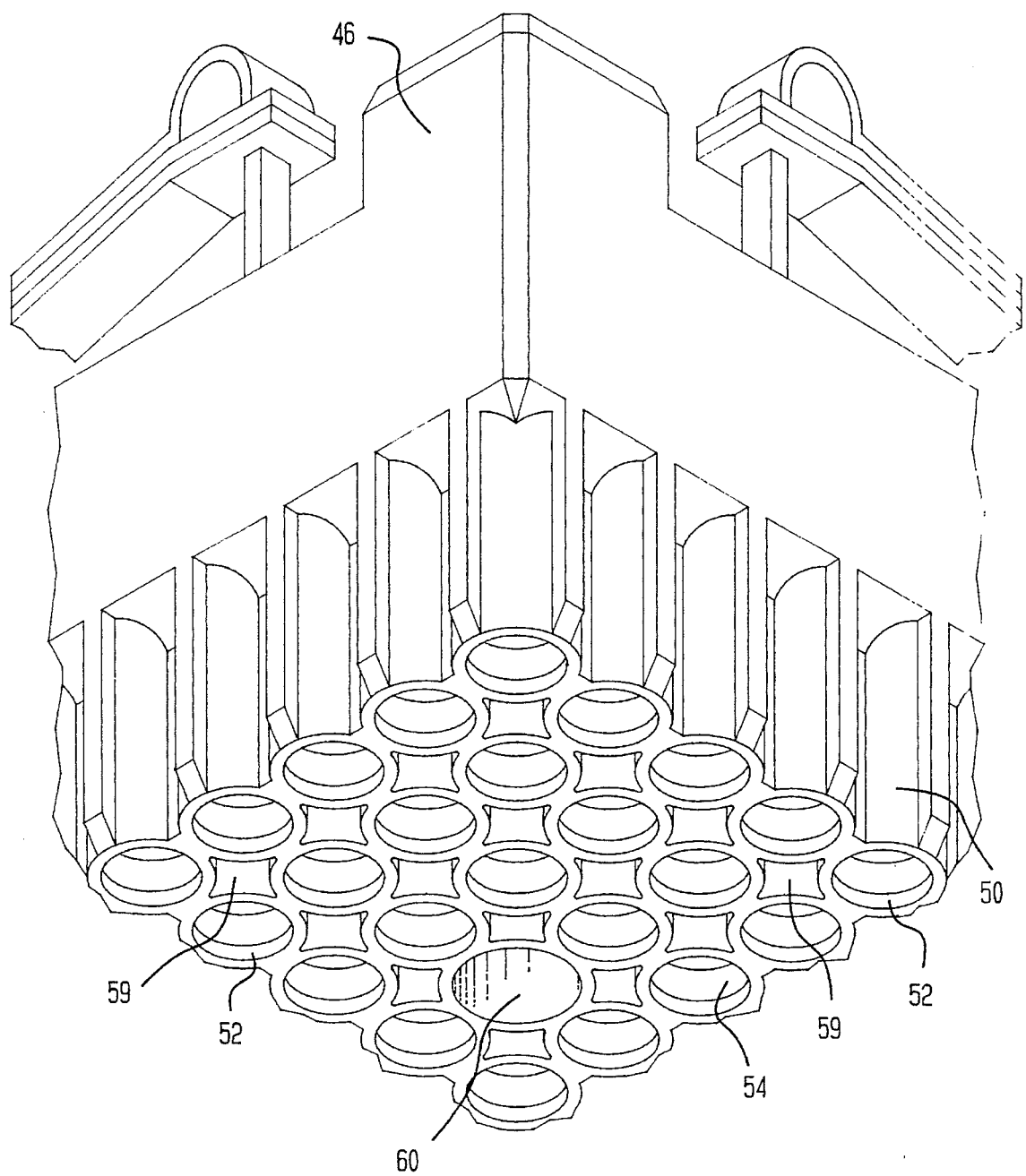
FIG. 5 is an enlarged perspective view of a portion of the upper tie plate of the fuel assembly shown in FIG. 2.
Figure 6:
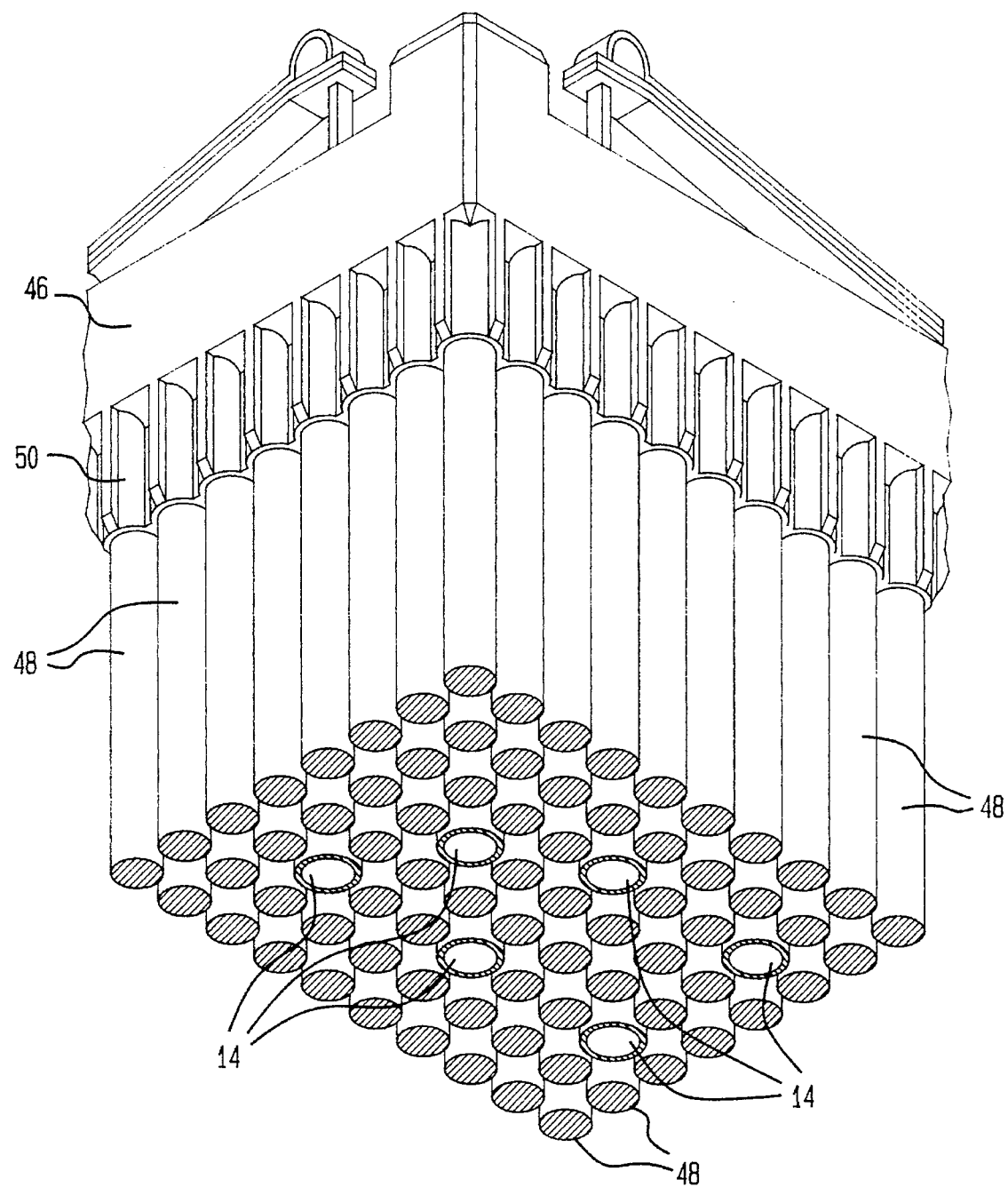
FIG. 6 is a perspective view looking up at a portion of the upper tie plate and fuel rod support housing showing the upper portions of the extended fuel rods positioned within each of their respective support locations.

Referring to FIG. 5 which is an enlarged perspective view of a portion of upper tie plate 46 shown in FIG. 2 but with fuel rods and guide tubes removed, fuel rod support housing 50 is shown having bores 52 in which the upper ends of the extended fuel rods are positioned. Guide tube cells 60 (only one of which is shown in FIG. 5) receives guide tubes 14 through which the control rods move to increase or decrease the reactivity of the core. FIG. 6 is a perspective view looking up at the upper tie plate 46 and fuel rod support housing 50 showing the upper portions of extended fuel rods 48 positioned within each of their respective support locations.

Figure 7:
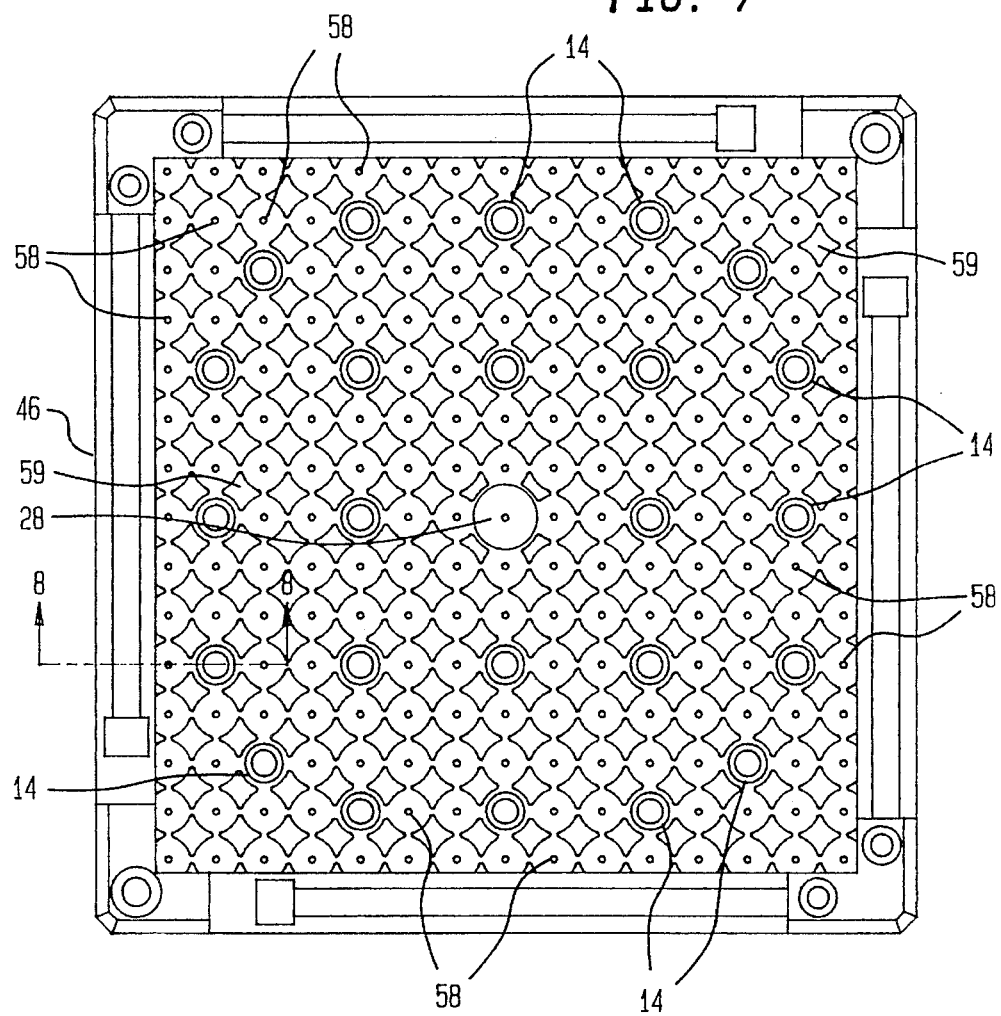
FIG. 7 is a top view of the fuel assembly shown in FIG. 2.
Figure 8:
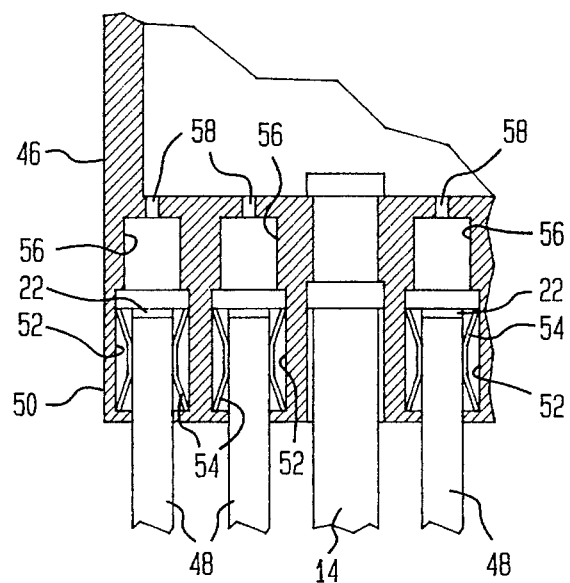
FIG. 8 is an enlarged partial sectional view of a portion of the tie plate of the fuel assembly shown in FIG. 2 taken along line 8—8 in FIG. 7.

FIG. 8 is a partial sectional view of upper tie plate 46 taken along line 8—8 in FIG. 7 and shows the upper end of each of several fuel rods 48 positioned within fuel rod support housing 50. Fuel rod support housing 50 is adapted to have bores 52 in each of which is positioned a spring 54 which exerts a lateral force against the wall of fuel rod 48 to overcome the vibratory forces induced by the coolant flow thereby preventing lateral motion and possible fuel rod fretting. Coolant flow holes 59 allow coolant/moderator to pass through upper tie plate 46 and exit the top of the fuel assembly. Communicating with bore 52 is chamber 56 having a discharge passageway 58 to allow any coolant moderator which enters the opening for the fuel rods in the fuel rod support housing to discharge at the downstream side of the upper tie plate.

As stated above, the fuel assembly of the present invention has several advantages. First, by eliminating the lowermost spacer, the pressure drop across the assembly is reduced and increased power is obtained. Second, by increasing the amount of fuel in each fuel rod by lengthening the active length of the fuel rods down to the lower tie plate, a further increase in power is obtained from the assembly. Third, by securing the lengthened fuel rods in the lower tie plate by the use of lateral restraint, vibration induced fatigue that would have resulted by the elimination of the lowermost spacer if the fuel rods were not restrained) is precluded, and fuel rod fretting resulting from possible lateral movement within the lower tie plate is also precluded. Fourth, by eliminating the uppermost spacer, the pressure drop across the assembly is again reduced and further increases in power is obtained. Fifth, by securing the upper end of the fuel rod in the upper tie plate by the use of lateral restraint, vibration induced fatigue that would have resulted by the elimination of the uppermost spacer (if the fuel rods were not restrained) is precluded, and fuel rod fretting resulting from lateral movement within the upper tie plate is precluded.

The advantages of increased power, decreased pressure drop, and elimination of fuel rod fretting to the lower and upper ends of the fuel rods, all of which is achieved without changing either the length of the fuel assembly, or the fuel rod diameter, or fuel rod pitch, make the present invention particularly useful for all pressurized water reactors.

While the foregoing description and drawings represent the preferred embodiments of the present invention, it will be apparent to those skilled in the art that various changes and modifications may be made therein without departing from the true spirit and scope of the present invention.

We claim:

1. A nuclear fuel assembly having a predetermined overall length for a pressurized water reactor, comprising:

(a) a lower tie plate having at least one aperture;
   (b) a guide tube having an upper end and a lower end, the lower end connected to the lower tie plate;
   (c) spacer grids spaced along the guide tube;
   (d) an upper tie plate which is attached to the upper end of the guide tube;
   (e) an instrumentation tube attached at one end to the lower tie plate and attached at an opposite end to the upper tie plate;
   (f) extended fuel rods which extend to the lower tie plate and which are spaced radially and supported along the guide tube by the spacer grids, at least one of the extended fuel rods having at a lower end a fuel rod lower end cap, the lower end cap being secured by a first spring which exerts a lateral force against the lower end cap within the aperture in the lower tie plate, the first spring being disposed within the aperture in the lower tie plate.

2. The nuclear fuel assembly for a pressurized water reactor as in claim 1 wherein the at least one of the extended fuel rods has an upper end, and the upper tie plate further includes a fuel rod support housing which extends down over the upper end of the at least one of the extended fuel rods.

3. The nuclear fuel assembly for a pressurized water reactor as in claim 2 wherein the fuel rod support housing is adapted to have at least one bore, the assembly further including a second spring positioned within the at least one bore in the fuel rod support housing of the upper tie plate, the second spring exerting a lateral force on the upper end of he at least one of the extended fuel rods positioned within the at least one bore in the fuel rod support housing of the upper tie plate.

* * * * *